Dec. 1, 1936.   M. TANZI   2,062,338
MACARONI DIE
Filed Jan. 13, 1934

INVENTOR
MARIO TANZI
BY Ezekiel Wolf
ATTORNEY

Patented Dec. 1, 1936

2,062,338

UNITED STATES PATENT OFFICE 2,062,338

MACARONI DIE

Mario Tanzi, Boston, Mass.

Application January 13, 1934, Serial No. 706,515

4 Claims. (Cl. 107—14)

The present invention relates to macaroni dies, and is particularly associated with the type of macaroni which has a hole in the center of it. The present invention not only applies to macaroni of the straight type, but also applies to macaroni of the elbow type and certain other novelty types of macaroni. The macaroni die as commonly used comprises a large die plate in which a very great number of individual macaroni dies are inserted. In the prior art it has been quite common practice to cut parts of these dies directly in the die plate and to insert other parts in the plates themselves.

In the present invention I have discovered that it is far more useful and that other remarkable results are accomplished by constructing the die elements as a unitary structure which may be inserted into the die plate as contrasted with making the die one in which both the die plate and the inserted element cooperate to produce the desired form.

Very frequenty in the use of the large die plates where the pressure of very tremendous magnitudes are employed, the die elements themselves become injured and must be removed. Sometimes in removing these elements the plates themselves become marked and scarred and after use for a short period of time, become so imperfect that they must be replaced. This entails considerable cost besides making it necessary to pull down a good part of the machinery.

In the present invention the die elements can be removed and replaced from the die plate with little trouble and such removal will never cause any contact of the tools with the plates themselves, and the plates therefore remain in good condition indefinitely.

In the present invention the central pin which forms the hole in the macaroni is made a part of the die element and while in some cases the pin may be aligned or supported in the perforation in the die plate, it is never dependent upon this support for its useful operation. It is possible therefore in removing the die elements to remove the whole structure and there is no difficulty encountered by the pin sticking or remaining in the die plate.

The present invention will be described in connection with a number of embodiments of the same for producing different types of macaroni. In each of these types the pin is arranged and supported in the die elements and the paste or dough is forced in such a manner through and around the pin to bring about the desired shape and form of the macaroni as it comes from the die plate.

The invention will be more fully described in connection with the embodiment described below and shown in the drawing annexed hereto.

Figure 1:
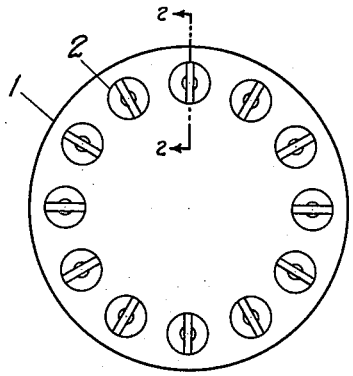
Figure 1 shows a plan view of a small die plate for making the so called straight macaroni.
Figure 2:
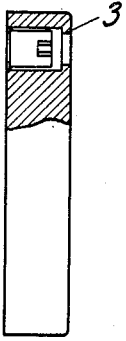
Figure 2 shows a side view of the die shown in Figure 1 with a section broken away somewhat along the line 2—2 of Figure 1.
Figure 3:
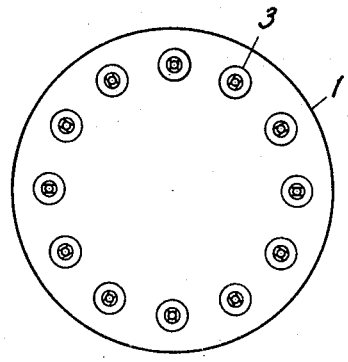
Figure 3 shows another plan view of the element shown in Figure 1 but looking from the other end of the die plate.
Figure 4:
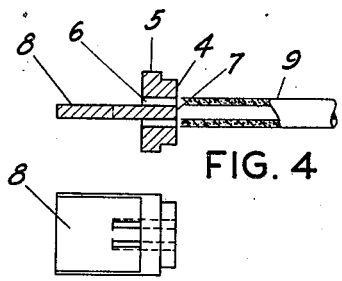
Figure 4 shows an enlarged section taken along the line 2—2 of Figure 1 showing a detail of the structure of the die elements shown in Figure 1.
Figure 5:
Figure 5 shows an end view of the element shown in Figure 4.

In the drawing shown in Figures 1, 2 and 3, there is provided a die plate 1, which has preferably cylindrical perforations 2, going through the die plate. The perforations as indicated in the drawing are similar at the bottom end and are provided with shoulders 3 against which the die elements may rest. The die elements themselves are shown in further detail in Figures 4, 5 and 6. They comprise a round or cylindrical shell 4 having a larger diameter at the back of the shell than at the front whereby an outwardly extending flange 5 is provided. The flange 5 is formed in size to fit in the shoulder 3 and prevent the die element from being forced therefore out of the bottom of the die plate. The hole 6 is provided within the shell, and in this hole is positioned a pin 7 which is formed as a part of a plate 8 extending from the back of the shell 4. The plate 8 has the same width as the flange 5 and is positioned in the perforation 2 in the plate in such a manner that the sides of the plate 8 touch the walls of the perforation. The paste or dough for the macaroni is forced under great pressure from the top of the cylinder, downward in the direction as shown in Figure 4 from the left to the right, and the macaroni as indicated at 9 is forced outward in a straight form as shown, rounded and with a hole in the center, approximately the size of the pin 7. A cutter may be used with the device to cut it off in desired lengths. In this type of die element, it will be noted that the pin is strongly supported from the shell itself and that the whole die element may be removed by a tool which makes contact with the die in position as indicated in Figure 3 and to which an impact may be applied as by a hammer or some other means. The die element in this manner may be driven upwards through the die plate and removed and a new one inserted. While the whole die element may be easily removed, it should also be noted that the passage of the paste through the die element is substantially free and unimpeded and that the pin is supported in such a way that the paste or dough may be forced easily and uniformly through the die element to produce a uniform, perfectly formed tube of macaroni.

The modifications shown in Figures 7, 8, 9 and 10 indicate a die element for the manufacture of so called small elbow macaroni.

In these figures the element 10 is provided similarly as in the previous figures with an outwardly extending flange 11, and a passage 12 formed between the outer shell and the pin 13. The difference between the die of the previous figures and the present figure is that the flange 11 is made longer in substantially one half of its diameter at 14 than in the other half at 15 so that the dough is somewhat more impeded in the passage through the opening 12 on the side of the long flange 14 than on the side of the short flange 15. The pin 13 located in the center of the shell is supported by the plate 16 which may be made integrally with the pin. In fact, as indicated in all of the figures, the die element is one piece, the shell, the support and the pin all being formed from one piece.

Figures 7, 8:
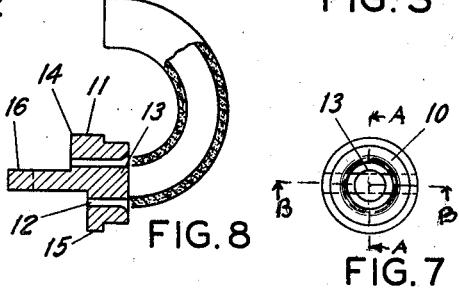
Figure 7 shows a view of a modification of a die element which may be applied to a die plate as illustrated in Figure 1.
Figure 8 shows a section of the element shown in Figure 7 taken upon the line A—A.
Figures 6, 9, 10:
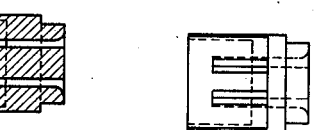
Figure 6 shows a view of the whole element shown in Figure 4 looking down from the top.
Figure 9 shows a section of the element of Figure 7 taken on the line B—B.
Figure 10 shows a view of the element shown in Figure 7 as seen looking downward from the top.

As indicated in Figures 8 and 9, the pin extends a considerable way back from the shell itself, the cut extending back as indicated at 17 towards the back end of the plate. This allows the paste or dough to fill the space between the pin and the shell and all sides furnish a particular freedom to the passage of the paste in the plane of the plate itself.

In the other figures is shown the die elements by which the helical macaroni may be formed.

This macaroni is preferably provided as indicated in the figure, with a center hole and with helical flanges twisting as a screw thread about the center hole tube.

Figures 11, 12, 13:
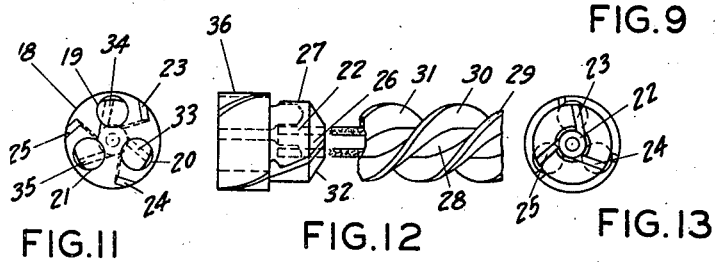
Figure 11 shows a further modification of the die element of Figure 1.
Figure 12 shows a view of the element shown in Figure 11 looking at it from the side.
Figure 13 shows a view of the element shown in Figure 11 looking at it from the other end.
Figures 14, 15, 16:
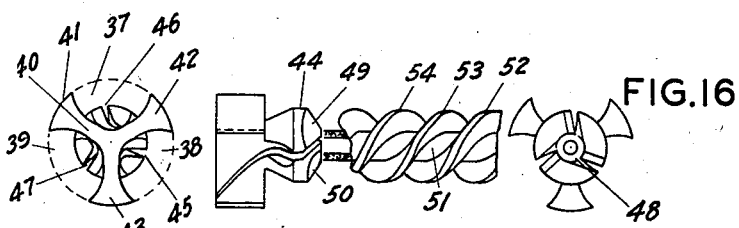
Fig. 14 shows a further modification of a die element which may be applied to the perforations of the die plate of Figure 1.
Figure 15 shows a side view of the element shown in Figure 14.
Figure 16 shows a view of the element shown in Figure 14 looking at it from the end.

As indicated in Figures 12 and 15, the macaroni may be formed with three separate flanges. Figure 11 shows a top view of the die plate element where the paste enters the die. The die consists of a body 18 in which a number of holes 19, 20 and 21 are made. These holes pass down through the body 18 communicating with a central hole 22 at the lower end of the die element. The communication between the opening 22 and the holes from the top of the die plate is obtained by means of side grooves 23, 24 and 25 which pass from the top or back part of the die element down to the bottom hole 22. The grooves, 23, 24 and 25, cut diagonally across the die element and deeper into the die element at the lower end than at the top. They cut across in such a manner that they join the passage from the top holes 19, 20, and 21 to the bottom hole 22. The grooves at their ends are positioned substantially to be tangential to the circular opening 22. The dough or paste as it passes through the die element through the holes 19, 20 and 21 come in contact with the slanting grooves 23, 24 and 25 through which the dough continues to pass, filling at the same time the space between the pin 26 and the hole 27 of the element 18. The dough in its inclined motion which is inclined substantially 60° downward in the groove, produces by its tangential force at the lower opening, a spinning motion which twists the macaroni and produces a macaroni as indicated by 28 in Figure 12, the three grooves producing the three flanges 29, 30 and 31. The lower face 32 of the die element may be cut backwards at an angle as indicated to allow the dough to be free from contact with the metallic surface. It may also be noted that in order to connect the openings from the top of the die element to the lower opening, the die element may be provided with holes 33, 34 and 35 made from the sides of the lower part of the die element to the point where the grooves cross the position of the downwardly extending holes.

It will be noted that the die element is provided with a top flange portion 36 and that the element itself is positioned in the die plate in such a manner that not only are the grooves 23, 24 and 25 walled up by the die plate itself, but also the holes 33, 34 and 35. The pin extending backward from the lower opening 22 is supported integrally from the body of the die element itself, the whole die being formed from a single piece of material.

In Figures 14, 15 and 16 is shown another form of a die element for the purpose of producing a macaroni similar to that indicated in Figure 12.

In Figure 14 the dough passes through the passages 37, 38 and 39 between the walls of the die plate and the die elements 40 which is provided with three wing elements 41, 42 and 43. The die element is cupped out as indicated in Figure 14 at the top of the die element and is tapered outwardly at the bottom in somewhat a conical fashion as indicated by the bottom piece 44. Extending from the top wings 41, 42 and 43 and cutting diagonally across the die element, are the grooves 45, 46 and 47. These grooves extend inwardly to the lower opening 48 and provide an inclined passage for the paste or dough coming between the wings 40, 41 and 42, and the whole of the die plate. The inclined passages 45, 46 and 47 communicate with the lower center opening 48 in substantially the same position as is shown in Figure 13, namely tangentially therewith.

As indicated in Figure 15, the lower face of the element 44 may be cut backwards as indicated at 49 and 50 to provide clearance for the paste as it twists after leaving the die element.

The difference in construction chiefly between the die element of Figures 11, 12 and 13, on the one part, and 14, 15 and 16 on the other part is that the dough or paste in the first case is forced in the grooves through holes in the die element itself, whereas in the second case the dough is forced into the grooves by passage between the die element and the walls of the die plate.

As indicated in Figure 15, the macaroni formed comprises a hollow tube 51 and spiral macaroni having three independent flanges 52, 53 and 54.

Having now described my invention, I claim:

1. A macaroni die comprising a die plate having a plurality of perforations adapted to receive individual die elements, said die elements comprising a cylindrical shell adapted to fit in the perforations in said plate, said shell having a higher wall at one side than the other, a pin positioned symmetrically in said shell and means extending from the back of the shell for supporting said pin, the passage on one side of the pin through the shell being longer than on the other, the pin being symmetrically positioned however in the shell.

2. In a macaroni die, a die element comprising a cylindrical shell, means forming an annular passage within said shell, said passage being longer on one side of the center than the other, and means external of the shell supporting said first named means.

3. In a macaroni die, a die element formed as a unitary piece comprising a cylindrical shell, a center cylindrical element positioned concentrically within said shell, said shell and center elements being higher on one side than the other, and a bridge element joining said center and said shell elements.

4. In a macaroni die, a die element formed as a unitary piece comprising a cylindrical shell, a center cylindrical element positioned concentrically within said shell, said shell and center elements being higher on one side than the other and a bridge element having side surfaces extending in the same direction as the said elements and joining the said elements together.

MARIO TANZI.